United States Patent
Ishioka et al.

(10) Patent No.: US 11,285,954 B2
(45) Date of Patent: Mar. 29, 2022

(54) VEHICLE, AND CONTROL APPARATUS AND CONTROL METHOD THEREOF

(71) Applicant: HONDA MOTOR CO., LTD., Tokyo (JP)

(72) Inventors: Atsushi Ishioka, Wako (JP); Kanta Tsuji, Wako (JP); Haruhiko Nishiguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 185 days.

(21) Appl. No.: 16/774,170

(22) Filed: Jan. 28, 2020

(65) Prior Publication Data

US 2020/0247414 A1 Aug. 6, 2020

(30) Foreign Application Priority Data

Feb. 5, 2019 (JP) .............................. JP2019-018825

(51) Int. Cl.
- *B60W 30/18* (2012.01)
- *B60W 50/10* (2012.01)
- *B60W 60/00* (2020.01)
- *G05D 1/02* (2020.01)
- *G01C 21/34* (2006.01)

(52) U.S. Cl.
CPC ...... *B60W 30/18163* (2013.01); *B60W 50/10* (2013.01); *B60W 60/0011* (2020.02); *G01C 21/3492* (2013.01); *G05D 1/0223* (2013.01)

(58) Field of Classification Search
None
See application file for complete search history.

(56) References Cited

U.S. PATENT DOCUMENTS

| | | | |
|---|---|---|---|
| 10,266,109 | B2 | 4/2019 | Fujii |
| 10,435,021 | B2 | 10/2019 | Ibuka et al. |
| 10,814,913 | B2 | 10/2020 | Fuji |
| 10,906,555 | B2 | 2/2021 | Vamamoto |
| 2018/0162396 | A1 | 6/2018 | Ibuka et al. |

(Continued)

FOREIGN PATENT DOCUMENTS

| | | |
|---|---|---|
| JP | 2008039501 A | 2/2008 |
| JP | 2009008573 A | 1/2009 |

(Continued)

OTHER PUBLICATIONS

Decision to Grant a Patent with partial translation for Japanese Patent Application No. 2019-018825 dated Jul. 5, 2021.

(Continued)

*Primary Examiner* — Abdhesh K Jha
(74) *Attorney, Agent, or Firm* — Thomas | Horstemeyer, LLP

(57) ABSTRACT

In a case in which a lane change operation is to be performed, a control unit performs travel control in accordance with a lane change mode selected among lane change modes. The lane change modes include a first mode in which the driver plans the lane change operation, and the driver issues an instruction to start the lane change operation, and a second mode in which the control unit plans the lane change operation, and the driver issues the instruction to start the lane change operation. An amount of operation performed by the driver to issue the instruction to the start of the lane change operation in the second mode is less than that in the first mode.

17 Claims, 5 Drawing Sheets

(56) References Cited

U.S. PATENT DOCUMENTS

| | | |
|---|---|---|
| 2018/0178714 A1 | 6/2018 | Fujii |
| 2018/0297640 A1 | 10/2018 | Fuji |
| 2019/0039627 A1 | 2/2019 | Yamamoto |
| 2020/0031343 A1 | 1/2020 | Ogata et al. |
| 2020/0290677 A1 | 9/2020 | Fuji |
| 2021/0114613 A1 | 4/2021 | Yamamoto |

FOREIGN PATENT DOCUMENTS

| | | |
|---|---|---|
| JP | 2015175824 A | 10/2015 |
| JP | 2017133893 A | 8/2017 |
| JP | 2018-094960 A | 6/2018 |
| JP | 2018-103767 A | 7/2018 |
| JP | 2018177181 A | 11/2018 |
| JP | 2018185242 A | 11/2018 |

OTHER PUBLICATIONS

Japanese Office Action with partial translation for Japanese Patent Application No. 2019-018825 dated Dec. 4, 2020.

VEHICLE, AND CONTROL APPARATUS AND CONTROL METHOD THEREOF

CROSS-REFERENCE TO RELATED APPLICATION

This application claims priority to and the benefit of Japanese Patent Application No. 2019-018825 filed on Feb. 5, 2019, the entire disclosure of which is incorporated herein by reference.

BACKGROUND OF THE INVENTION

Field of the Invention

The present invention relates to a vehicle, and a control apparatus and control method thereof.

Description of the Related Art

As a function of automated driving and driving support of a vehicle, there is provided a function for the vehicle to change lanes without an operation by a driver. Japanese Patent Laid-Open No. 2018-103767 discloses that a request to start a lane change support operation is detected when a driver operates a turn signal lever and a request to cancel the lane change support operation is detected when the driver operates the turn signal lever in the opposite direction.

SUMMARY OF THE INVENTION

Depending on the travel environment of a vehicle, an automated driving system may be able to automatically execute a lane change operation without requiring approval from the driver. On the other hand, there may be a travel environment in which a lane change operation cannot be proposed by the automated driving system. An aspect of the present invention is to provide a technique that allows an instruction corresponding to an automation level to be made for a lane change operation.

According to an embodiment, a control apparatus of a vehicle is provided. The apparatus comprises: a recognition unit configured to recognize a travel environment of the vehicle; a generation unit configured to generate a travel plan based on the travel environment; and a control unit configured to perform, based on the travel plan, travel control including at least one of acceleration/deceleration and/or steering of the vehicle, wherein in a case in which a lane change operation is to be performed, the control unit selects one lane change mode among a plurality of lane change modes that have different degrees of participation by a driver of the vehicle, and performs the travel control in accordance with the selected lane change mode, wherein the plurality of lane change modes include a first mode in which the driver of the vehicle plans the lane change operation, and the driver of the vehicle issues an instruction to start the lane change operation, and a second mode in which the control unit plans the lane change operation, and the driver of the vehicle issues the instruction to start the lane change operation, and wherein an amount of operation performed by the driver to issue the instruction to the start of the lane change operation in the second mode is less than the amount of operation performed by the driver to issue the instruction to the start of the lane change operation in the first mode.

DESCRIPTION OF THE EMBODIMENTS

Figure 1:
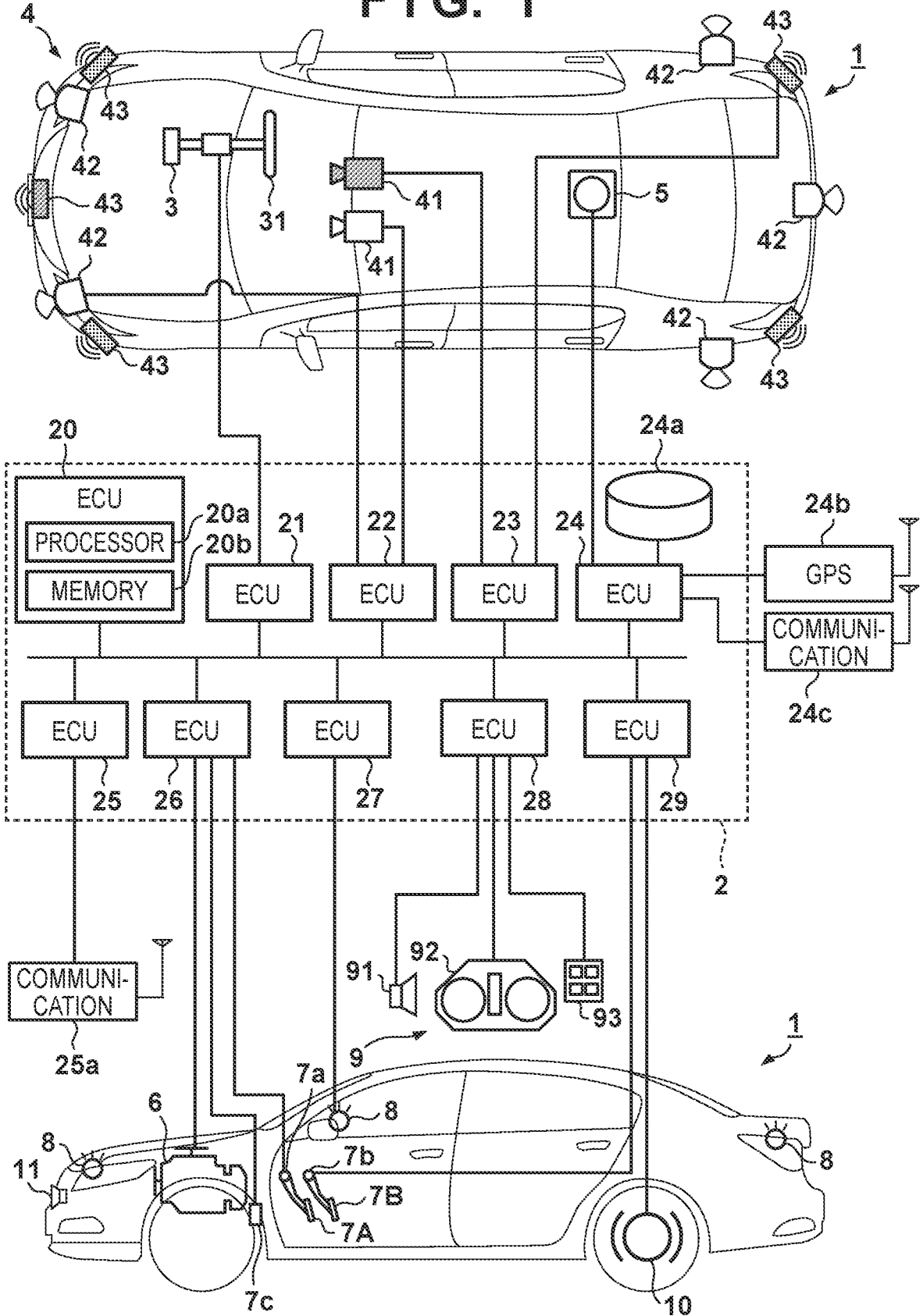
FIG. 1 is a block diagram for explaining an example of the arrangement of a vehicle according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

A vehicle 1 includes a vehicle control apparatus 2 (to be simply referred to as the control apparatus 2 hereinafter) that controls the vehicle 1. The control apparatus 2 includes a plurality of ECUs 20 to 29 communicably connected by an in-vehicle network. Each ECU functions as a computer which includes a processor represented by a CPU, a memory such as a semiconductor memory, an interface with an external device, and the like. The memory stores programs to be executed by the processor, data to be used by the processor for processing, and the like. Each ECU may include a plurality of processors, memories, and interfaces. For example, the ECU 20 includes a processor 20a and a memory 20b. Processing by the ECU 20 is executed by the processor 20a executing an instruction included in a program stored in the memory 20b. Alternatively, the ECU 20 may include a dedicated integrated circuit such as an ASIC or the like to execute processing by the ECU 20. Other ECUs may be arranged in a similar manner.

The functions and the like provided by the ECUs 20 to 29 will be described below. Note that the number of ECUs and the provided functions can be appropriately designed, and they can be subdivided or integrated as compared to this embodiment.

The ECU 20 executes control associated with automated driving of the vehicle 1. In automated driving, at least one of steering and/or acceleration/deceleration of the vehicle 1 is automatically controlled. In a control example to be described later, both steering and acceleration/deceleration are automatically controlled.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the direction of travel of the vehicle 1.

The ECUs 22 and 23 perform control of detection units 41 to 43 that detect the peripheral state of the vehicle and information processing of detection results. Each detection unit 41 is a camera (to be sometimes referred to as the camera 41 hereinafter) that captures the front side of the vehicle 1. In this embodiment, the cameras 41 are attached to the windshield inside the vehicle cabin at the front of the roof of the vehicle 1. When images captured by the cameras 41 are analyzed, the contour of a target or a division line (a white line or the like) of a lane on a road can be extracted.

The detection unit 42 is a LIDAR (Light Detection and Ranging) (to be sometimes referred to as the LIDAR 42 hereinafter), and detects a target around the vehicle 1 or measures the distance to a target. In this embodiment, five LIDARs 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each LIDAR 42 and information processing of detection results. The ECU 23 performs control of the other camera 41 and each radar 43 and information processing of detection results. Since two sets of devices that detect the peripheral state of the vehicle are provided, the reliability of detection results can be improved. In addition, since detection units of different types such as cameras, LIDARs, and radars are provided, the peripheral environment of the vehicle can be analyzed from various aspects.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information and traffic information and acquires these pieces of information. The ECU 24 can access a map information database 24a formed in the storage device. The ECU 24 searches for a route from the current position to the destination. The ECU 24, the map information database 24a, and the GPS sensor 24b form a so-called navigation device.

The ECU 25 includes a communication device 25a for inter-vehicle communication. The communication device 25a performs wireless communication with another vehicle in the periphery and exchanges information between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices 8 (lighting instruments such as headlights, taillights, and the like) including direction indicators (turn signals). In the example shown in FIG. 1, the lighting devices 8 are provided in the front portion, door mirrors, and the rear portion of the vehicle 1. The ECU 27 further includes a sound device 11 including a horn or the like directed to the outside of the vehicle. The lighting devices 8, the sound device 11, or a combination of them has a function of providing information to the outside of the vehicle 1.

The ECU 28 controls an input/output device 9. The input/output device 9 outputs information to the driver and accepts input of information from the driver. A voice output device 91 notifies the driver of the information by voice. A display device 92 notifies the driver of information by displaying an image. The display device 92 is arranged, for example, in front of the driver's seat and constitutes an instrument panel or the like. Note that although a voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified. An input device 93 is a switch group that is arranged in a position where the driver can perform an operation, is used to issue an instruction to the vehicle 1, and may also include a voice input device. The ECU 28 can perform a guidance operation related to the travel control by the ECU 20. The details of the guidance operation will be described later. The input device 93 can include a switch used to control the travel control operation by the ECU 20. The input device 93 can include a camera for detecting the direction of the line of sight of the driver.

The ECU 29 controls a brake device 10 and a parking brake (not shown). The brake device 10 is, for example, a disc brake device which is provided for each wheel of the vehicle 1 and decelerates or stops the vehicle 1 by applying resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stop state of the vehicle 1. In addition, if the transmission of the power plant 6 includes a parking lock mechanism, it can be operated to maintain the stop state of the vehicle 1.

Figure 2:
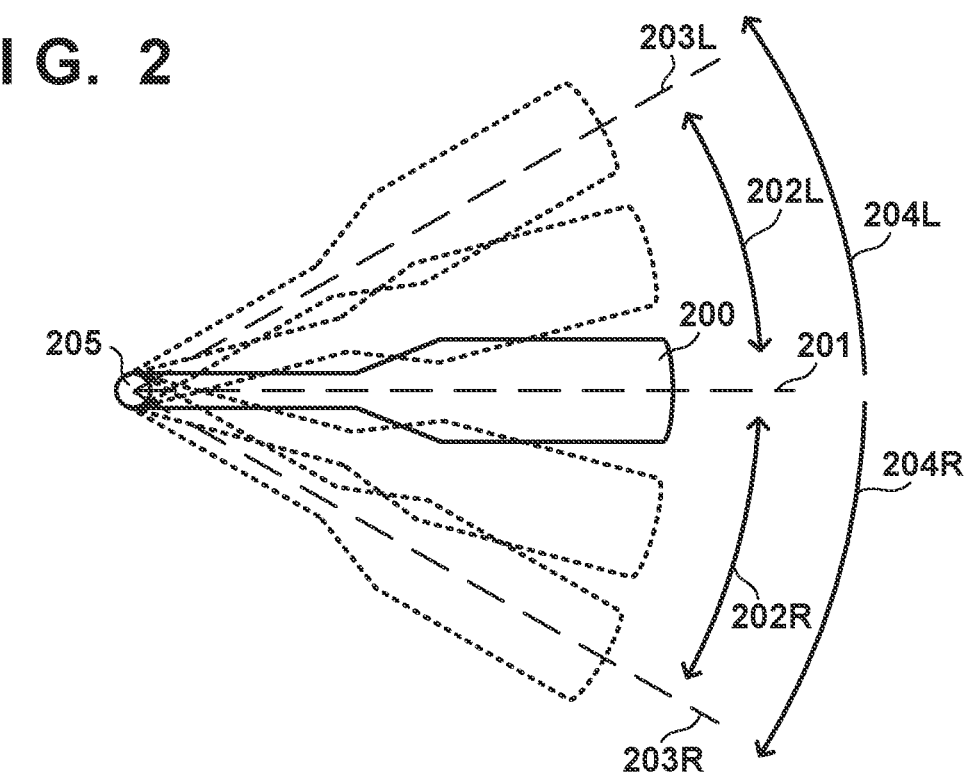
FIG. 2 is a schematic view for explaining an example of the arrangement of a turn signal lever according to the embodiment.

An example of the arrangement of a turn signal lever 200 of the vehicle 1 will be described with reference to FIG. 2. The turn signal lever 200 is attached near (for example, the right-side rear portion of) the steering wheel 31, and is used by the driver to instruct the vehicle 1 to make a turn signal blink or stop blinking. In addition, as will be described later, the turn signal lever 200 is also used by the driver to make a lane change operation start request and a lane change operation cancellation request to the vehicle 1. The operation of the turn signal lever 200 by the driver is detected by, for example, the ECU 27.

Directions in which the turn signal lever 200 can be moved include a clockwise direction 204R and a counterclockwise direction 204L about a shaft 205. The clockwise direction 204R and the counterclockwise direction 204L are merely an example of two directions which are different from each other. The directions in which the turn signal lever 200 can be moved may also include directions toward and away from the driver.

Positions to which the turn signal lever 200 can be moved include a neutral position 201, middle positions 202R and 202L, and end positions 203R and 203L. The neutral position 201 is a position where the turn signal lever 200 is placed when the driver is not instructing the vehicle 1.

The middle position 202R is a position in the clockwise direction 204R with respect to the neutral position 201. The middle position 202L is a position in the counterclockwise direction 204L with respect to the neutral position 201. If there is no operation force from the driver when the turn signal lever 200 is at one of the middle positions 202R and 202L, the turn signal lever 200 will be returned to the neutral position 201 by a physical biasing mechanism. Each of the middle positions 202R and 202L can be called a half position. Each of the middle positions 202R and 202L can be a position that has a predetermined width as shown in FIG. 2.

The end position 203R is a position in the clockwise direction 204R with respect to the neutral position 201. The end position 203L is a position in the counterclockwise direction 204L with respect to the neutral position 201. If there is no operation force from the driver when the turn signal lever 200 is at one of the end positions 203R and 203L, the turn signal lever 200 can be maintained at the position by a physical lock mechanism. Each of the end positions 203R and 203L can be called a stuck position.

The amount of movement from the neutral position 201 to the end position 203R is greater than the amount of movement from the neutral position 201 to the middle position 202R. In other words, the middle position 202R is between the neutral position 201 and the end position 203R. There may be play between the middle position 202R and the neutral position 201. That is, in a case in which the turn signal lever 200 is within a predetermined amount of movement from the neutral position 201, the ECU 27 may assume that the turn signal lever 200 is not in the middle position 202R. In a similar manner, there may be play between the middle position 202R and the end position 203R. The relationship between the neutral position 201 and the middle position 202L and the relationship between the neutral position 201 and the end position 203L are the same as the relationship between the neutral position 201 and the middle position 202R and the relationship between the neutral position 201 and the end position 203R described above.

In a case in which the driver wants to make the right-side turn signal of the vehicle 1 blink, the driver will operate the turn signal lever 200 to the end position 203R. The ECU 27 will make the right-side turn signal of the vehicle 1 blink in accordance with this operation. On the other hand, if the driver wants to make the left-side turn signal of the vehicle 1 blink, the driver will operate the turn signal lever 200 to the end position 203L. The ECU 27 will make the left-side turn signal of the vehicle 1 blink in accordance with this operation.

Figure 3:
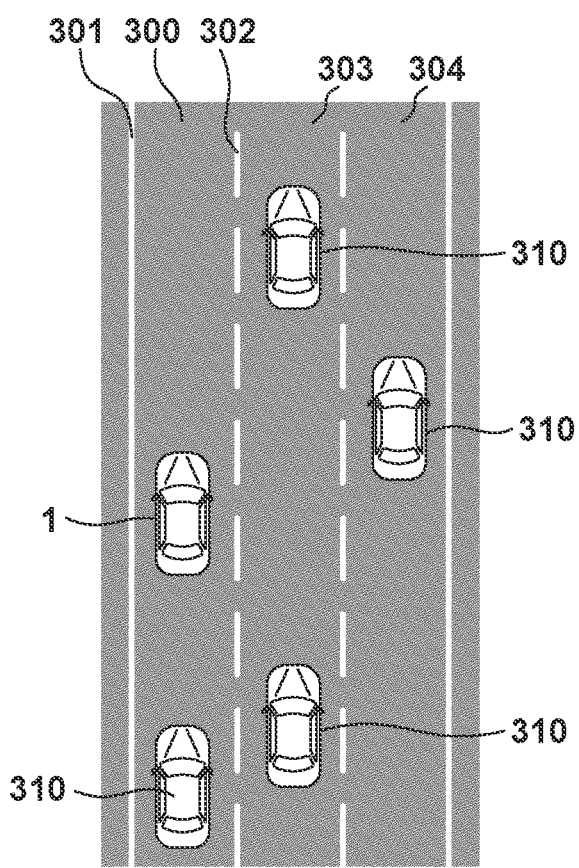
FIG. 3 is a schematic view for explaining a control method of a lane change operation according to the embodiment.

The outline of a lane change operation executed by the ECU 20 will be described with reference to FIG. 3. The vehicle 1 is traveling on a lane 300. That is, the lane 300 is the travel lane. The lane 300 is defined by a left-side division line 301 (for example, the left-side line of the road) and a right-side division line 302 (for example, the lane boundary line). A lane 303 is adjacent to the right side of the lane 300, and a lane 304 is adjacent to the right side of the lane 303. Vehicles 310 other than the vehicle 1 are traveling on the lanes 300, 303, and 304.

The ECU 20 generates a travel plan based on the travel environment of the vehicle 1 recognized by the detection units 41 to 43, and executes a lane change operation autonomously or under the driver's instruction to implement the travel plan. For example, this lane change operation is an operation to move the vehicle 1 from the lane 300 to the lane 303. In order to execute the lane change operation, the ECU 20 may perform travel control which includes both the acceleration/deceleration and the steering of the vehicle 1.

The ECU 20 will select one lane change mode from a plurality of lane change modes that have different degrees of participation by the driver of the vehicle 1, and perform travel control under this selected lane change mode. The lane change mode will be simply referred to as a change mode hereinafter. A plurality of change modes that have different degrees of participation by the driver of the vehicle 1 can also be called a plurality of change modes that have different automation levels. The automation level increases as the degree of participation by the driver decreases, and the automation level decreases as the degree of participation by the driver increases.

For example, the plurality of change modes can include the following three change modes. The first change mode is a change mode in which the driver of the vehicle 1 plans the lane change operation and the driver of the vehicle 1 issues an instruction to start the lane change operation. In this lane change mode, the driver of the vehicle 1 will consider the state of travel and the route to the destination, and determine whether a lane change operation needs to be performed. Subsequently, if a lane change operation needs to be performed, the driver of the vehicle 1 will instruct the vehicle 1 to start the lane change operation at a timing at which the lane change operation can be executed. The ECU 20 will start the lane change operation in response to this instruction.

The second change mode is a change mode in which the ECU 20 plans the lane change operation and the driver of the vehicle 1 issues the instruction to start the lane change operation. In this change mode, the ECU 20 will consider the state of travel and the route to the destination, and determine whether a lane change operation needs to be performed. If a lane change operation needs to be performed, the ECU 20 will make a lane change proposal to the driver. The driver of the vehicle 1 will consider the state of travel in response to this lane change proposal, and instruct the vehicle 1 to start the lane change operation at a timing in which the lane change operation can be executed. The ECU 20 will start the lane change operation in response to this instruction.

The third change mode is a change mode in which the ECU 20 plans the lane change operation and the start of the lane change operation is decided by the ECU 20. In this change mode, the ECU 20 will consider the state of travel and the route to the destination, and determine whether a lane change operation needs to be performed. If a lane change operation needs to be performed, the ECU 20 will consider the state of travel and start the lane change operation at a timing in which the lane change operation can be executed. The driver of the vehicle 1 may be able to issue an instruction to cancel this lane change operation.

Among the three change modes described above, the first change mode has the lowest automation level (that is, the highest degree of participation by the driver), and the third change mode has the highest automation level (that is, the lowest degree of participation by the driver). The change mode that can be selected by the ECU 20 is not limited to the three change modes described above. For example, the ECU 20 may select a mode in which the driver of the vehicle 1 plans the lane change operation, and the start of the lane change operation is decided by the ECU 20. Furthermore, it may be set so some of the three change modes described above cannot be selected. For example, the ECU 20 may select one of the first change mode and the second change mode or select one of the second change mode and the third change mode.

Figure 4:
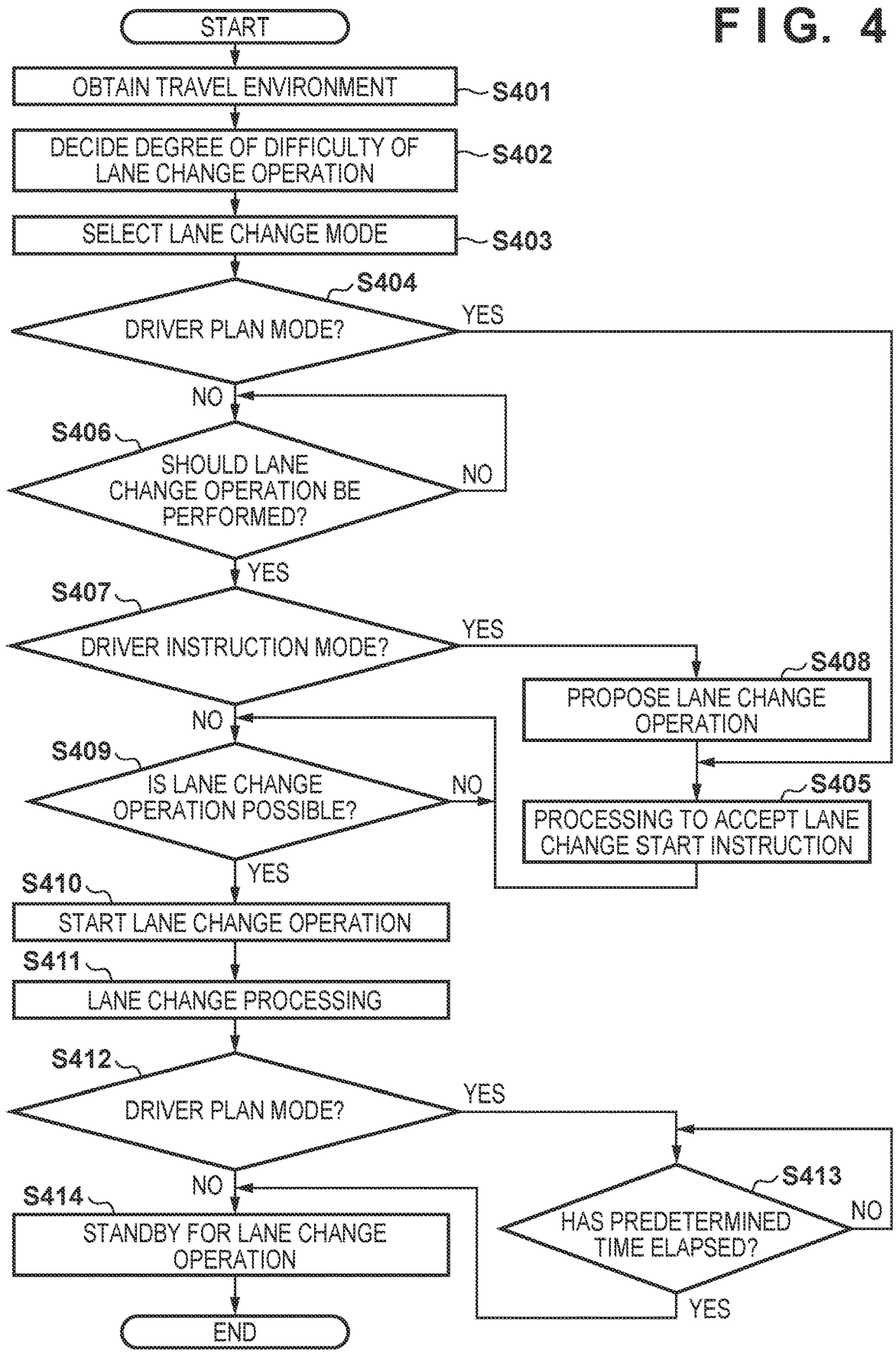
FIG. 4 is a flowchart for explaining the control method of the lane change operation according to the embodiment.

A control method of the vehicle 1 for performing a lane change operation will be described with reference to FIG. 4. In this control method, the control apparatus (more specifically, the ECU 20) of the vehicle 1 will select one change mode among the plurality of change modes and execute travel control to perform the lane change operation in accordance with the selected change mode. The control method shown in FIG. 4 can be performed by the processor 20*a* of the ECU 20 executing a program stored in the memory 20*b*. Alternatively, some or all of the processes of the method may be executed by a dedicated circuit such as an ASIC (Application-Specific Integrated Circuit). In the case of the former, the processor 20*a* will be the component for a specific operation, and in the case of the latter, the dedicated circuit will be the component for a specific operation. The control method of FIG. 4 is executed repeatedly while travel control by automated traveling is executed by the ECU 20.

In step S401, the ECU 20 obtains information of the current travel environment of the vehicle 1 recognized by the detection units 41 to 43. This information of the travel environment may include the state (the speed and the like) of the vehicle 1, the peripheral environment (the state of the division line 301 and the like), and the state of each peripheral vehicle (the speed and the position of each peripheral vehicle). Although the information of the current travel environment is obtained in step S401 in the example of FIG. 4, the obtainment of the information of the current travel environment will be performed repeatedly while the control method of FIG. 4 is executed.

In step S402, the ECU 20 decides the degree of difficulty of the lane change operation in the current environment obtained in step S401. The degree of difficulty of the lane change operation will simply be referred to as the change difficulty degree hereinafter. The change difficulty degree is decided based on the state (the speed or the like) of the vehicle 1, the state of the lane related to the lane change operation, the state of other vehicles traveling the periphery of the vehicle 1, and the like.

In step S403, the ECU 20 selects, from the plurality of change modes, a change mode based on the change difficulty degree decided in step S402. As described above, the higher the change difficulty degree, the ECU 20 will select a change mode with a higher degree of driver participation (that is, with a lower automation level), and the lower the change difficulty degree, the ECU 20 will select a change mode with a lower degree of driver participation (that is, with a higher automation level). The ECU 20 can select the change mode in consideration of the automation level of the current travel control process. For example, in the case of a normal travel environment, the ECU 20 will select the above-described first change mode if the automation level is at a level in which the duty to grip the steering wheel 31 is imposed on the driver, and will select the above-described second change mode if the automation level is at the level in which the duty to grip the steering wheel 31 is not imposed on the driver but the duty to perform periphery monitoring is imposed on the driver. If the travel environment is good, the ECU 20 may select the above-described second change mode even if the automation level is at the level in which the duty to grip the steering wheel 31 is imposed on the driver. In addition, if the travel environment is bad, the ECU 20 may select the above-described first change mode even if the automation level is at the level in which the duty to grip the steering wheel 31 is not imposed on driver but the duty to perform periphery monitoring is imposed on the driver.

In step S404, the ECU 20 determines whether the change mode selected in step S403 is a change mode in which the lane change operation is planned by the driver. If the change mode is the change mode in which the lane change operation is planned by the driver (YES in step S404), the ECU 20 shifts the process to step S405. Otherwise (NO in step S404), the process shifts to step S406.

In step S405, the ECU 20 executes processing to accept a lane change start instruction. The process of step S405 is performed in the case of the change mode (the first change mode described above) in which the lane change operation is planned by the driver of the vehicle 1. In this change mode, the driver of the vehicle 1 will issue an instruction to start the lane change operation. Hence, in this processing, the ECU 20 will wait for the driver to operate the turn signal lever 200 to issue an instruction to the start of the lane change operation, and will determine whether an instruction to start the lane change operation has been issued in accordance with the contents of the operation. The details of this processing will be described later.

In step S406, the ECU 20 determines, based on the current travel environment, whether the lane change operation should be performed. If the lane change operation should be performed (YES in step S406), the ECU 20 shifts the process to step S407. Otherwise (NO in step S406), the process of step S406 is repeated. The process of step S406 is performed in the case of the change mode (the second change mode or the third change mode described above) in which the lane change operation is planned by the ECU 20. Hence, the ECU 20 will consider the state of travel (for example, a case in which the vehicle is to pass a preceding vehicle) and the route to the destination, and wait until the state changes to the state in which the lane change operation is to be executed.

In step S407, the ECU 20 determines whether the change mode selected in step S403 is a change mode in which a lane change start instruction is issued by the driver. If the change mode is the change mode change mode in which the lane change start instruction is issued by the driver (YES in step S407), the ECU 20 shifts the process to step S408. Otherwise (NO in step S407), the process shifts to step S409.

In step S408, the ECU 20 will make a lane change proposal to the driver. The process of step S408 is performed in the case of the change mode (the second change mode described above) in which the lane change operation is planned by the ECU 20 and the lane change start instruction is issued by the driver of the vehicle 1. Hence, the ECU 20 will make a lane change proposal to the driver to obtain a lane change instruction from the driver. Subsequently, the ECU 20 will execute the process of step S405 described above to wait until an instruction is input by the driver.

In step S409, the ECU 20 will determine whether the lane change operation can be executed based on the current travel environment. If the lane change operation can be executed (YES in step S409), the ECU 20 shifts the process to step S410. Otherwise (NO in step S409), the process of step S409 will be repeated. The process of step S409 will be performed in any of the first to third change modes described above.

In step S410, the ECU 20 starts the lane change operation. The process of step S410 will be executed in a case in which the driver has made a lane change start instruction in step S405 or in a case in which the ECU 20 has determined, in step S409, that the lane change operation can be executed.

In step S411, the ECU 20 will execute lane change processing. The ECU 20 will end the process of this step when the lane change operation has been completed or the lane change operation has been canceled, and shift the process to that of the next step. The process of this step will be described in detail later.

In step S412, the ECU 20 will determine whether the change mode selected in step S403 is a change mode in which a lane change start instruction is issued by the driver. If it is determined to be the change mode in which the lane change start instruction is issued by the driver (YES in step S412), the ECU 20 shifts the process to step S413. Otherwise (NO in step S412), the process shifts to step S414.

In step S413, after the completion of the lane change operation, the ECU 20 will determine whether a predetermined time has elapsed or whether the vehicle 1 has traveled a predetermined distance. If the predetermined time has elapsed or whether the vehicle 1 has traveled the predetermined distance (YES in step S413), the ECU 20 shifts the process to step S414. Otherwise (NO in step S413), the process of step S413 will be repeated.

In step S414, the ECU 20 will stand by for an additional lane change operation. In a case in which the change mode selected in step S403 is the change mode in which the lane change start instruction is issued by the driver, the process of step S414 will be executed after the process of step S413 has been executed. The change mode in which the lane change start instruction is issued by the driver will be selected in the case of a travel environment in which the change difficulty degree is high. In such a travel environment, it is highly difficult to perform a lane change operation continuously in a short period. Thus, the ECU 20 will suppress execution of an additional lane change operation until a predetermined time has elapsed or until a predetermined distance has been traveled. On the other hand, in a case in which the change mode selected in step S403 is the change mode in which the lane change operation is planned by the ECU 20, the process of step S414 will be executed without executing the process of step S413. The change mode in which the ECU 20 plans the lane change operation is selected in the case of a travel environment with an intermediate or low change difficulty degree. Thus, the ECU 20 will allow execution of an additional lane change operation even before (and also after) the predetermined time has elapsed or the predetermined distance has been traveled.

In the above-described control method of FIG. 4, processing steps are added or omitted appropriately in accordance with the change mode that can be selected by the ECU 20. For example, the process of step S404 will be omitted in a case in which the above-describe first change mode is to be removed as a selection candidate. Also, in step S412, the ECU 20 determined whether the change mode selected in step S403 is the change mode in which the lane change start instruction is issued by the driver. Alternatively, the ECU 20 may determine whether the change mode selected in step S403 is the change mode in the lane change start instruction is issued by the driver.

In addition, in a case in which travel control is to be performed based on a travel plan with a set destination, the ECU 20 can prioritize and select a change mode with less participation by the driver of the vehicle 1 compared to that of a case in which travel control is to be performed based on a travel plan without a set destination. For example, the ECU 20 may select one of the second change mode and the third change mode described above in a case in which travel control is to be performed based on a travel plan with a set destination, and select the first change mode in a case in which travel control is to be performed based on a travel plan without a set destination. Alternatively, in a case in which travel control is to be performed based on a travel plan with a set destination, the ECU 20 may perform the change mode selection in step S403 after reducing the change difficulty degree decided in step S402.

Also, the ECU 20 may switch the change mode that can be selected based on whether the driver of the vehicle 1 is gripping the steering wheel 31. For example, it may be set so that the ECU 20 will be able to select one of the first change mode, the second change mode, and the third change mode described above while the driver is gripping the steering wheel 31. It may also be set so that the ECU 20 will be able to select one of the first change mode and the second change mode described, but not be able to select the third change mode while the driver is not gripping the steering wheel 31. Alternatively or in addition this, the ECU 20 may switch the selectable change mode based on the degree of the periphery monitoring duty imposed on the driver of the vehicle 1. For example, in a case in which the degree of the periphery monitoring duty imposed on the driver is higher than a threshold level (for example, in a case in which the periphery monitoring duty needs to be performed), it may be set so that the ECU 20 will be able to select the first change mode, the second change mode, or the third change mode described above. In a case in which the degree of the periphery monitoring duty imposed on the driver is lower than a threshold level (for example, in a case in which the periphery monitoring duty need not be performed), it may be set so that the ECU 20 will be able to select one of the first change mode or the second change mode described above, but not be able to select the third change mode.

Figure 5:
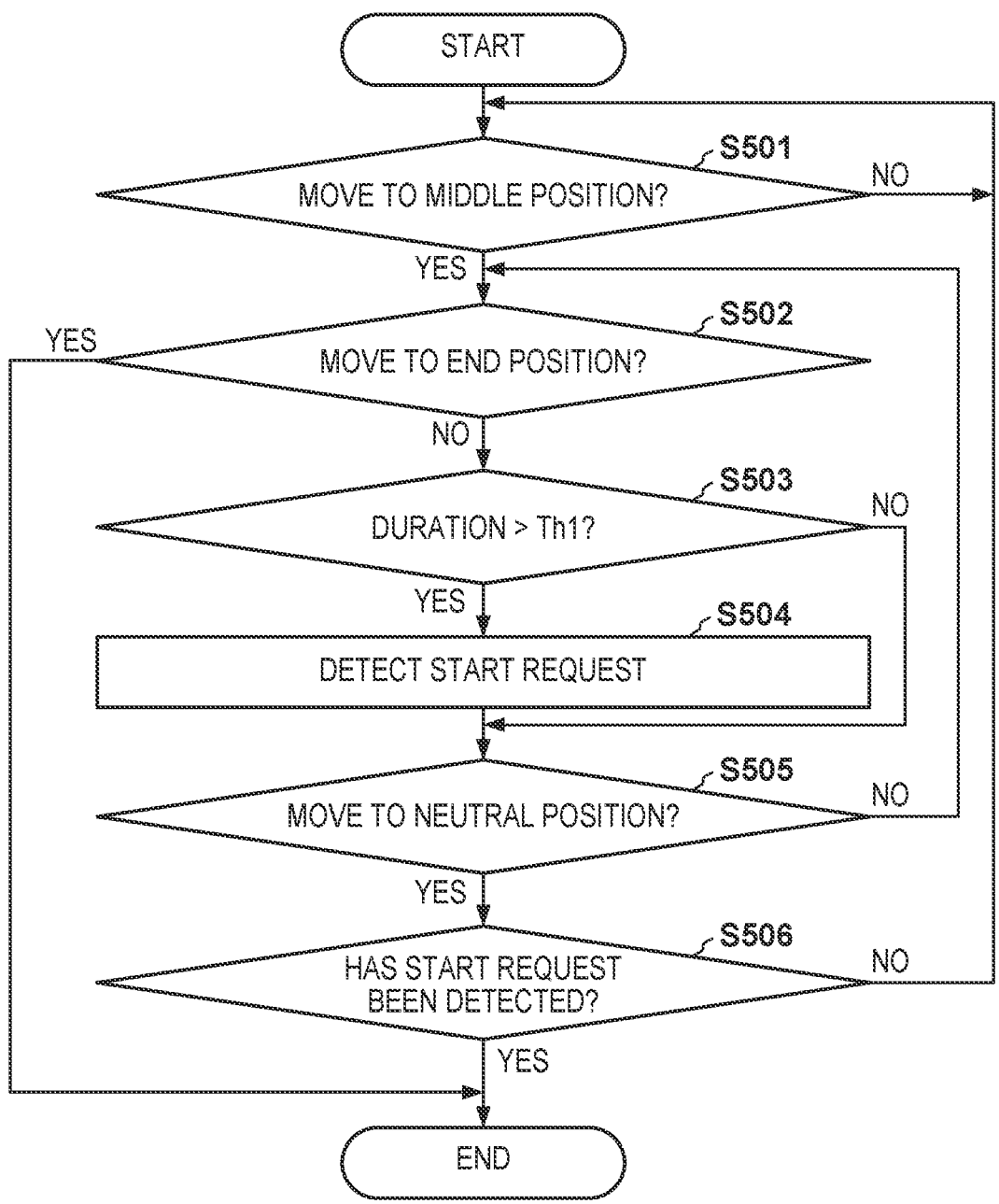
FIG. 5 is a flowchart for explaining processing to accept a lane change start instruction according to the embodiment.

Details of the process (processing to accept a lane change start instruction) of step S405 of FIG. 4 will be described with reference to FIG. 5. In step S501, the ECU 20 determines whether the turn signal lever 200 has been operated to the middle position 202R or 202L. If the turn signal lever 200 has been operated to the middle position 202R or 202L (YES in step S501), the ECU 20 shifts the process to step S502. Otherwise (NO in step S501), the process shifts to step S501. In this manner, the ECU 20 will wait for the turn signal lever 200 to be operated from the neutral position 201 to the middle position 202R or 202L in one of the clockwise direction 204R and the counterclockwise direction 204L. For the sake of descriptive convenience hereinafter, assume that the turn signal lever 200 has moved to the middle position 202R in step S501. In a case in which the turn signal lever 200 has moved to the middle position 202L in step S501, the clockwise direction 204R and the counterclockwise direction 204L will be switched in the following explanation. The ECU 27 can make the turn signal start to blink in response to the turn signal lever 200 being operated to the middle position 202R or 202L.

In step S502, the ECU 20 determines whether the turn signal lever 200 has been operated to the end position 203R. If the turn signal lever 200 has been operated to the end position 203R (YES in step S502), the ECU 20 will end the processing. Otherwise (NO in step S502), the process shifts to step S503. In a case in which the turn signal lever 200 has moved to the end position 203R, the ECU 20 will determine that the driver is going to manually perform a lane change operation to an adjacent lane (in this case, the adjacent lane on the right side). Hence, the ECU 20 will end the automatic lane change operation shown in FIG. 4.

In step S503, the ECU 20 determines whether the duration in which the turn signal lever 200 has been maintained at the middle position 202R (by the driver) is longer than a threshold time Th1 (for example, 2 sec). If the duration in which the turn signal lever 200 has been maintained at the middle position 202R is longer than the threshold time Th1 (YES in step S503), the ECU 20 shifts the process to step S504. Otherwise (NO in step S503), the process shifts to step S505.

The threshold time Th1, used for the comparison with the duration in which the turn signal lever 200 has been maintained at the middle position 202R (by the driver), can be set with a different value for each change mode by the ECU 20. For example, the threshold time Th1 (for example, 0.5 sec) for accepting a lane change start instruction in the above-described second change mode (the change mode in which the ECU 20 plans the lane change operation and the driver of the vehicle 1 issues the lane change instruction) may be set shorter than the threshold time Th1 (for example, 1 sec) for accepting a lane change start instruction in the above-described first change mode (the change mode in which the driver of the vehicle 1 plans the lane change operation and the driver of the vehicle 1 issues the lane change start instruction). As a result, the driver can issue the lane change start instruction with a small amount of operation when the automation level is high.

In addition to or instead of switching the threshold time Th1, the ECU 20 may switch the threshold of another amount of operation, for example, the amount of movement from the neutral position 201 of the turn signal lever 200. Also, in a case in which the lane change start instruction is to be detected from the operation of an operation element (for example, the steering wheel 31, a lane change button, or the like) other than the turn signal lever 200, the threshold of the amount of operation of the operation element may be switched. For example, a smaller amount of operation will be needed for the ECU 20 to detect the lane change start instruction as the automation level of the change mode increases. In the present invention, the amount of operation includes a temporal amount (the operation time), a spatial amount (the amount of movement), and a combination of these amounts (the speed or the like).

In step S504, the ECU 20 detects a request to start the lane change operation. In this manner, the request to start the lane change operation is detected based on the fact that the turn signal lever 200 has been operated to the middle position 202R and the fact that the duration since this operation is longer than the threshold time Th1 (for example, 2 sec). At this point, only the start request will be detected, and the lane change operation will not be started.

In step S505, the ECU 20 determines whether the turn signal lever 200 has moved to the neutral position 201. If the turn signal lever 200 has moved to the neutral position 201 (YES in step S505), the ECU 20 shifts the process to step S506. Otherwise (NO in step S505), the process shifts to step S502.

In step S506, the ECU 20 determines whether a request to start the lane change operation has been detected in step S504. If the request to start the lane change operation has been detected in step S504 (YES in step S506), the ECU 20 ends the processing and shifts the process to step S410 of FIG. 4. Otherwise (NO in step S506), the process shifts to step S501.

In the control method described above, in step S503, whether the duration in which the turn signal lever 200 has been maintained at the middle position 202R is longer than the threshold time Th1 was determined when the turn signal lever 200 was at the middle position 202R. Alternatively, whether the duration in which the turn signal lever 200 has been maintained at the middle position 202R is longer than the threshold time Th1 can be determined after the turn signal lever 200 has moved from the middle position 202R to the neutral position 201. For example, instead of performing the processes of steps S503 and S504 between step S502 and step S505, these processes can be performed between step S505 and step S506.

The process of step S411 (lane change processing) of FIG. 4 will be described in detail with reference to FIG. 6. In step S601, the ECU 20 determines whether the lane change operation has been completed. For example, the ECU 20 may determine that the lane change operation has been completed when the vehicle 1 has moved to the vicinity of the lane center of the adjacent lane (the change destination lane), or may determine that the lane change operation has been completed when the vehicle 1 has crossed the division line between the current travel lane and the adjacent lane by a predetermined ratio or more. If the lane change operation has been completed (YES in step S601), the ECU 20 ends the processing. Otherwise (NO in step S601), the process shifts to step S602. The ECU 27 will make the turn signal stop blinking in response to the completion of the lane change operation.

In step S602, the ECU 20 determines whether the turn signal lever 200 has been operated to the middle position 202L on the opposite side. If the turn signal lever 200 has been operated to the middle position 202L on the opposite side (YES in step S602), the ECU 20 shifts the process to step S603. Otherwise (NO in step S602), the process shifts to step S601. In this manner, the ECU 20 will wait until the turn signal lever 200 is operated to the middle position 202L on the opposite side or the lane change operation is completed.

In step S603, the ECU 20 determines whether the duration in which the turn signal lever 200 has been maintained at the middle position 202L (by the driver) is longer than a threshold time Th2. If the duration in which the turn signal lever 200 has been maintained at the middle position 202L is longer than a threshold time Th2 (YES in step S603), the ECU 20 shifts the process to step S608. Otherwise (NO in step S603), the process shifts to step S604. The duration in which the turn signal lever 200 has been maintained in the middle position 202L is the duration from the most recent switch to the middle position 202L to the point of the determination. The threshold time Th2 is set to be shorter than the threshold time Th1 and is, for example, 1.5 sec. By setting, as a condition for detecting a cancellation request, the fact that the turn signal lever has been maintained at the middle position on the opposite side for the threshold time Th2 or more, it is possible to suppress excessive detection that can occur when the turn signal lever 200 has moved to the opposite side in a case in which the driver has excessively operated the turn signal lever 200 while trying to return the turn signal lever to the neutral position 201.

In step S604, the ECU 20 determines whether the turn signal lever 200 has moved to the neutral position 201. If the turn signal lever 200 has moved to the neutral position 201 (YES in step S604), the ECU 20 shifts the process to step S601. Otherwise (NO in step S604), the process shifts to step S605. In this manner, in a case in which the turn signal lever 200 has returned to the neutral position 201 before the elapse of threshold time Th2 after the turn signal lever 200 has been operated to the middle position 202L, the ECU 20 will wait for the turn signal lever 200 to move again to the middle position 202L or for the lane change operation to be completed.

In step S605, the ECU 20 determines whether the turn signal lever 200 has been operated to the end position 203L. If the turn signal lever 200 has been operated to the end position 203L (YES in step S605), the ECU 20 shifts the process to step S606. Otherwise (NO in step S605), the process shifts to step S603.

In step S606, the ECU 20 determines whether the duration of the time in which the turn signal lever 200 has been maintained at the end position 203L (by the lock mechanism) is longer than a threshold time Th3 (for example, 0.1 sec). If the duration of the time in which the turn signal lever 200 has been maintained at the end position 203L is longer than the threshold time Th3 (YES in step S606), the ECU 20 shifts the process to step S608. Otherwise (NO in step S606), the process shifts to step S607. The duration in which the turn signal lever 200 has been maintained at the end position 203L is the duration from the most recent switch to the end position 203L to the point of the determination. The threshold time Th3 may be shorter than the threshold time Th2.

In step S607, the ECU 20 determines whether the turn signal lever 200 has been operated to the middle position 202L. If the turn signal lever 200 has been operated to the middle position 202L (YES in step S607), the ECU 20 shifts the process to step S603. Otherwise (NO in step S607), the process shifts to step S606.

In step S608, the ECU 20 detects that the driver has made a request to cancel the lane change operation during the execution of the lane change operation. In this manner, a cancellation request is detected based on the fact that the turn signal lever 200 has been operated to the middle position 202L during the execution of the lane change operation and the fact that the duration in which the turn signal lever has been maintained at the middle position 202L is longer than the threshold time Th2. Since the operation performed to make a request to start the lane change operation and the operation performed to make a request to cancel the lane change operation become symmetrical to each other, the driver will be able to intuitively make a request to cancel the lane change operation. In addition, since the cancellation request can be made at the middle position 202L, the driver's intention to cancel the operation can be detected more quickly.

Furthermore, the ECU 20 will detect the cancellation request based on the fact that the turn signal lever 200 has been operated to the end position 203L during the execution of the lane change operation and the fact that the duration of the time in which the turn signal lever has been maintained at the end position 203L is longer than the threshold time Th3. Since the cancellation request can be detected under the same logic as that of the detection of the start request, there is consistency between the start and cancellation operations. Also, since the threshold time Th3 is shorter than the threshold time Th2, the driver can make the cancellation request in a shorter period of time. The value of the threshold time Th3 may be zero. In this case, a cancellation request will be detected immediately in response to the turn signal lever 200 being operated to the end position 203L.

In step S609, the ECU 20 determines whether the lane change operation can be canceled. If the lane change operation can be canceled (YES in step S609), the ECU 20 shifts the process to step S610. Otherwise (NO in step S609), the process shifts to step S611. For example, the ECU 20 may determine whether the lane change operation can be canceled based on the progress of the lane change operation.

More specifically, the ECU 20 may determine that the lane change operation can be canceled in a case in which the vehicle 1 has remained in the travel lane. On the other hand, the ECU 20 may determine that the lane change operation cannot be canceled in a case in which the vehicle 1 is straddling the white line between the travel lane and the adjacent lane. In a case in which the lane change operation is progressing in this manner, it is conceivable that the succeeding vehicle of the vehicle 1 will be traveling under the assumption that the vehicle 1 is performing a lane change operation. Hence, it is safer for the vehicle 1 to complete the lane change operation than to return to its original travel lane.

In step S610, the ECU 20 cancels the lane change operation, maintains traveling in the original travel lane, and ends the processing. The ECU 27 may make the turn signal stop blinking at the point when the lane change operation has been canceled. In step S611, the ECU 20 completes the lane change operation and ends the processing. The ECU 27 may make the turn signal stop blinking at the point when the lane change operation has been completed.

Figure 6:
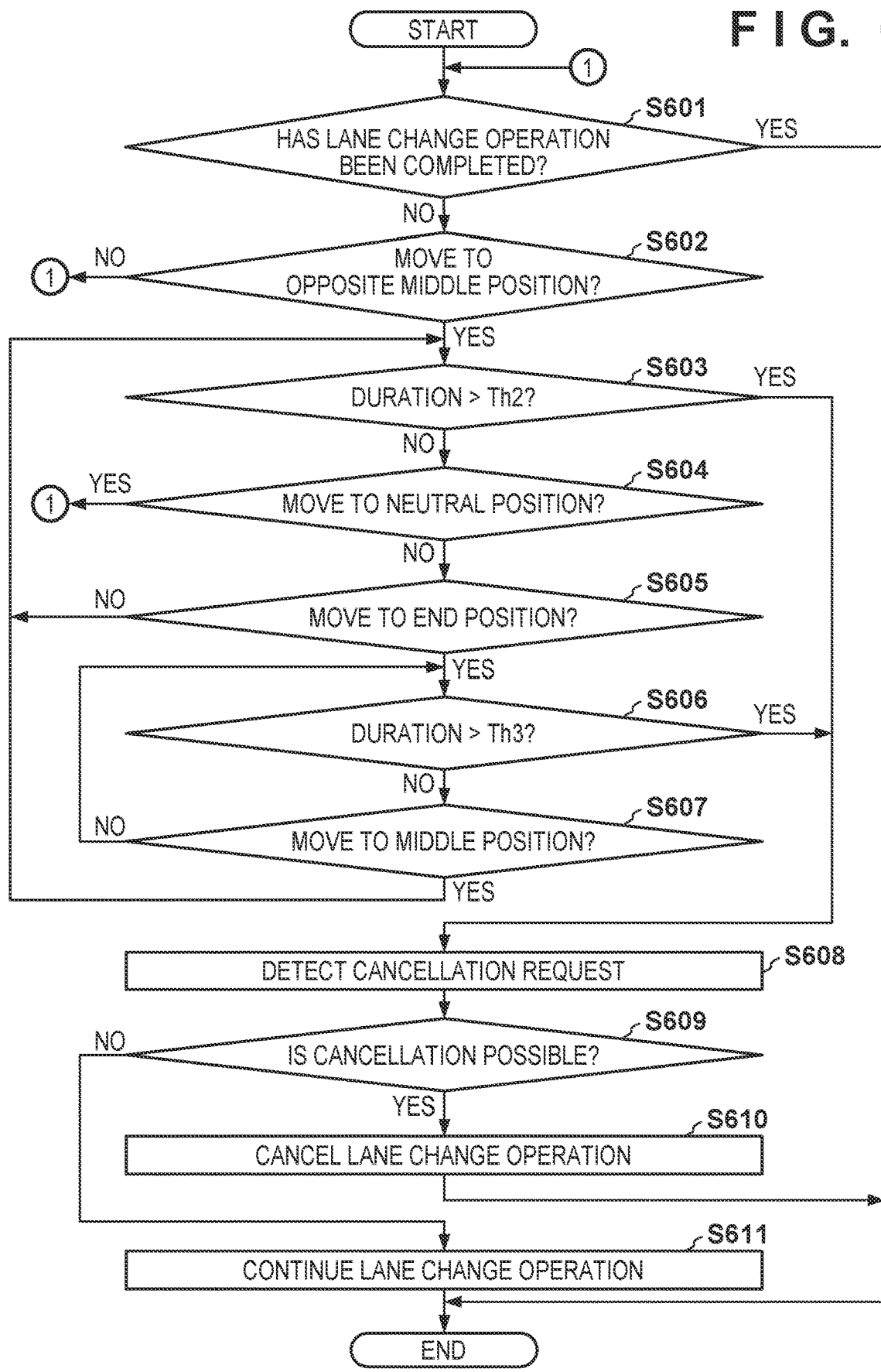
FIG. 6 is a flowchart for explaining lane change processing according to the embodiment.

In the control method of FIG. 6, an instruction to cancel the lane change operation can be detected in response to the same operation regardless of which change mode (the first change mode described above) has been set to start the lane change operation. For example, the ECU 20 may detect the cancellation of the lane change operation based on the same operation of the turn signal lever 200 (for example, holding the turn signal lever in the middle position for the same threshold time) by the driver, regardless of whether the lane change operation has been started based on any of the first change mode, the second change mode, and the third change mode described above. Since a lane change cancellation instruction can be made by a consistent operation, it will be less confusing for the driver.

Alternatively, the ECU 20 may set a different operation as the operation to perform a lane change cancellation instruction for each change mode. For example, the threshold time Th2 (for example, 0.5 sec) for accepting a lane change cancellation instruction in the second change mode and the third change mode (the changes modes in which the ECU 20 plans the lane change operation) described above may be set shorter than the threshold time Th2 (for example, 1 sec) for accepting a lane change cancellation instruction in the first change mode (the change mode in which the driver of the vehicle 1 plans the lane change operation) described above. As a result, the driver can issue a lane change cancellation instruction with a small amount of operation in a case in which the automation level is high.

In addition to or instead of switching the threshold time Th2, the ECU 20 may switch the threshold of another amount of operation, for example, the amount of movement from the neutral position 201 of the turn signal lever 200. Also, in a case in which the lane change cancellation instruction is to be detected by the operation of an operation element (for example, an operation element for steering such as the steering wheel 31, an operation element for acceleration/deceleration such as the accelerator pedal 7A or the brake pedal 7B, or the like) other than the turn signal lever 200, the threshold of the amount of operation of this operation element may be switched. For example, a smaller amount of operation will be needed for the ECU 20 to detect the lane change cancellation instruction as the automation level of the change mode increases. In this application, the amount of operation includes a temporal amount (the operation time), a spatial amount (the amount of movement), and a combination of these amounts (the speed or the like).

Summary of Embodiment

<Arrangement 1>

There is provided a control apparatus (2) of a vehicle (1), the apparatus comprising:

a recognition unit (41-43) configured to recognize a travel environment of the vehicle;

a generation unit (20) configured to generate a travel plan based on the travel environment; and a control unit (20) configured to perform, based on the travel plan, travel control including at least one of acceleration/deceleration and/or steering of the vehicle, wherein in a case in which a lane change operation is to be performed, the control unit selects one lane change mode among a plurality of lane change modes that have different degrees of participation by a driver of the vehicle, and performs the travel control in accordance with the selected lane change mode, wherein the plurality of lane change modes include a first mode in which the driver of the vehicle plans the lane change operation, and the driver of the vehicle issues an instruction to start the lane change operation, and a second mode in which the control unit plans the lane change operation, and the driver of the vehicle issues the instruction to start the lane change operation, and wherein an amount of operation performed by the driver to issue the instruction to the start of the lane change operation in the second mode is less than the amount of operation performed by the driver to issue the instruction to the start of the lane change operation in the first mode.

According to this arrangement, an instruction corresponding to the automation level can be issued for a lane change operation. More specifically, in a case in which a lane change operation is planned by the control unit, the driver can issue a start instruction by a small amount of operation.

<Arrangement 2>

There is provided the apparatus according to arrangement 1, wherein in the first mode, the control unit detects the instruction to start the lane change operation in response to a turn signal lever (200) of the vehicle having been held in a predetermined position (202R, 202L), which is different from a neutral position (201), for not less than a first threshold time, and in the second mode, the control unit detects the instruction to start the lane change operation in response to the turn signal lever (200) of the vehicle having been held in a predetermined position for not less than a second threshold time, and the second threshold time is shorter than the first threshold time.

According to this arrangement, it is possible to reduce confusion about the operation because the driver can issue an instruction to start the lane change operation by operating the turn signal lever to the same position.

<Arrangement 3>

There is provided the apparatus according to arrangement 2, wherein after detecting the instruction to start the lane change operation, the control unit starts the lane change operation in response to the turn signal lever having moved from the predetermined position to the neutral position.

According to this arrangement, since the lane change operation will be started on the satisfaction of a condition that the turn signal lever has returned to the neutral position, it will be easier for the driver to grasp the start timing of the lane change operation. In addition, since the lane change operation will be started in a state in which the driver is not operating the turn signal lever, it will be easier for the driver to intervene when the driver needs to perform periphery monitoring or the like.

<Arrangement 4>

There is provided the apparatus according to any one of arrangements 1 to 3, wherein the plurality of lane change modes include a third mode in which the control unit plans the lane change operation and the control unit decides the start of the lane change operation, and the control apparatus can select the first mode, the second mode, and the third mode while the driver is gripping a steering wheel (31) of the vehicle, and can select the first mode and the second mode but cannot select the third mode while the driver is not gripping the steering wheel of the vehicle.

According to this arrangement, the operation by the driver can be simplified because the control unit will decide the start of the lane change operation while the driver is not gripping the steering wheel of the vehicle.

<Arrangement 5>

There is provided the apparatus according to any one of arrangements 1 to 3, wherein the plurality of lane change modes include a third mode in which the control unit plans the lane change operation and the control unit decides the start of the lane change operation, and the control unit can select the first mode, the second mode, and the third mode in a case in which a degree of periphery monitory duty imposed on the driver is higher than a threshold level, and can select the first mode and the second mode but cannot select the third mode in a case in which the degree of periphery monitory duty imposed on the driver is lower than a threshold level.

According to this embodiment, the operation by the driver can be simplified because the control unit will decide the start of the lane change operation in a case in which the degree of periphery monitoring duty imposed on the driver is low.

<Arrangement 6>

There is provided the apparatus according to any one of arrangements 1 to 5, wherein the control unit detects, in the first mode, an instruction to cancel the lane change operation in response to an operation performed on a predetermined operation element by the driver, and detects, in the second mode, the instruction to cancel the lane change operation in response to an operation performed on the predetermined operation element by the driver.

According to this arrangement, it is possible to reduce confusion about the operation because the driver can issue an instruction to cancel the lane change operation by the same operation.

<Arrangement 7>

There is provided the apparatus according to any one of arrangements 1 to 6, wherein until a predetermined time has elapsed or until a predetermined distance has been traveled since the completion of the lane change operation, the control unit suppresses execution of an additional lane change operation if the completed lane change operation was a lane change operation in accordance with the first mode, and the control unit allows the execution of the additional lane change operation if the completed lane change operation was a lane change operation in accordance with the second mode.

According to this arrangement, it is possible to prevent continuous execution of a lane change operation in an environment in which the degree of difficulty of a lane change operation is high.

<Arrangement 8>

There is provided the apparatus according to any one of arrangements 1 to 7, wherein the control unit prioritizes a lane change mode with a low degree of participation by the driver of the vehicle in a case in which the travel control is to be performed based on a travel plan set with a destination, compared with a case in which the travel control is to be performed based on a travel plan set without a destination.

According to this arrangement, the automation level can be improved in a case in which a destination is set in the travel plan.

<Arrangement 9>

There is provided a control apparatus (2) of a vehicle (1), the apparatus comprising:

a recognition unit (41-43) configured to recognize a travel environment of the vehicle;

a generation unit (20) configured to generate a travel plan based on the travel environment; and a control unit (20) configured to perform, based on the travel plan, travel control including at least one of acceleration/deceleration and/or steering of the vehicle, wherein in a case in which a lane change operation is to be performed, the control unit selects one lane change mode among a plurality of lane change modes that have different degrees of participation by a driver of the vehicle, and performs the travel control in accordance with the selected lane change mode, wherein the plurality of lane change modes include a third mode in which a driver of the vehicle plans the lane change operation, and a fourth mode in which the control unit plans the lane change operation, and wherein an amount of operation performed to issue an instruction to cancel the lane change operation started in accordance with the fourth mode is less than the amount of operation performed to issue the instruction to cancel the lane change operation started in accordance with the third mode.

According to this arrangement, an instruction corresponding to the automation level can be issued for a lane change operation. More specifically, in a case in which a lane change operation is planned by the control unit, the driver can issue a cancel instruction by a small amount of operation.

<Arrangement 10>

There is provided the apparatus according to arrangement 9, wherein the control unit detects the instruction to cancel the lane change operation in response to an operation of a turn signal lever (200) of the vehicle, and the amount of operation performed to issue the instruction to cancel the lane change operation includes at least one of a time in which the turn signal lever is held at a predetermined position (202R, 202L) different from a neutral position (201) and/or an amount of movement from the neutral position of the turn signal lever.

According to this arrangement, an instruction corresponding to the automation level can be issued for a lane change operation by switching the amount of operation of the turn signal lever.

<Arrangement 11>

There is provided the apparatus according to arrangement 9, wherein the control unit detects the instruction to cancel the lane change operation in response to an operation of an operation element (31, 7A, 7B) for accelerating/decelerating and/or steering the vehicle, and the amount of operation performed to issue the instruction to cancel the lane change operation includes at least one of an operation time of the operation element and/or an amount of movement of the operation element.

According to this embodiment, it is possible to issue an instruction corresponding to the automation level for the lane change operation by switching the amount of operation of the operating element for accelerating/decelerating or steering the vehicle.

<Arrangement 12>

There is provided a vehicle (1) comprising a control apparatus defined in any one of arrangements 1 to 11.

According to this embodiment, a vehicle including the control apparatus described above can be provided.

<Arrangement 13>

There is provided a control method of a vehicle (1), the method comprising:

recognizing (S301) a travel environment of the vehicle;

generating a travel plan based on the travel environment; and performing (S402-S414), based on the travel plan, travel control including at least one of acceleration/deceleration and/or steering of the vehicle, wherein in a case in which a lane change operation is to be performed in the travel control, one lane change mode is selected (S403) among a plurality of lane change modes that have different degrees of participation by a driver of the vehicle, and the travel control is performed (S404-S414) in accordance with the selected lane change mode, wherein the plurality of lane change modes include a first mode in which the driver of the vehicle plans the lane change operation, and the driver of the vehicle issues an instruction to start the lane change operation, and a second mode in which a control unit included in the vehicle plans the lane change operation, and the driver of the vehicle issues the instruction to start the lane change operation, and wherein an amount of operation performed by the driver to issue the instruction to the start of the lane change operation in the second mode is less than the amount of operation performed by the driver to issue the instruction to the start of the lane change operation in the first mode.

According to this embodiment, an instruction corresponding to the automation level can be issued for a lane change operation. More specifically, in a case in which a lane change operation is planned by the control unit, the driver can issue a start instruction by a small amount of operation.

<Arrangement 14>

There is provided a control method of a vehicle (1), the method comprising:

recognizing (S301) a travel environment of the vehicle;

generating a travel plan based on the travel environment; and performing (S402-S414), based on the travel plan, travel control including at least one of acceleration/deceleration and/or steering of the vehicle, wherein in a case in which a lane change operation is to be performed in the travel control, one lane change mode is selected (S403) among a plurality of lane change modes that have different degrees of participation by a driver of the vehicle, and the travel control is performed (S404-S414) in accordance with the selected lane change mode, wherein the plurality of lane change modes include
a third mode in which a driver of the vehicle plans the lane change operation, and
a fourth mode in which a control unit included in the vehicle plans the lane change operation, and
wherein an amount of operation performed to issue an instruction to cancel the lane change operation started in accordance with the fourth mode is less than the amount of operation performed to issue the instruction to cancel the lane change operation started in accordance with the third mode.

According to this arrangement, an instruction corresponding to the automation level can be issued for a lane change operation. More specifically, in a case in which a lane change operation is planned by the control unit, the driver can issue a stop instruction by a small amount of operation.

<Arrangement 15>

There is provided a non-transitory storage medium including a program configured to cause a computer to function as each unit of a control apparatus defined any one of arrangements 1 to 11.

According to this arrangement, a program for generating the control apparatus described above can be provided.

The invention is not limited to the foregoing embodiments, and various variations/changes are possible within the spirit of the invention.

What is claimed is:

1. A control apparatus of a vehicle, the apparatus comprising:
at least one processor circuit with a memory comprising instructions, that when executed by the processor circuit, cause the at least one processor circuit to at least:
recognize a travel environment of the vehicle;
generate a travel plan based on the travel environment; and
perform, based on the travel plan, travel control including at least one of acceleration/deceleration and/or steering of the vehicle, wherein in a case in which a lane change operation is to be performed, the instructions further cause the at least one processor circuit to at least:
select one lane change mode among a plurality of lane change modes that have different degrees of participation by a driver of the vehicle, and
perform the travel control in accordance with the selected lane change mode,
wherein the plurality of lane change modes include
a first mode in which the driver of the vehicle plans the lane change operation, and the driver of the vehicle issues an instruction to start the lane change operation, and
a second mode in which the instructions further cause the at least one processor circuit to at least plan the lane change operation, and the driver of the vehicle issues the instruction to start the lane change operation,
wherein an operation time of operation on an operation element of the vehicle performed by the driver to issue the instruction to the start of the lane change operation in the second mode is less than an operation time of operation on the operation element performed by the driver to issue the instruction to the start of the lane change operation in the first mode, and
wherein a position of the operation element for the driver to issue the instruction to the start of the lane change operation in the second mode is a same as a position of the operation element for the driver to issue the instruction to the start of the lane change operation in the first mode.

2. The apparatus according to claim 1, wherein
the operation element is a turn signal lever of the vehicle,
in the first mode, the instructions further cause the at least one processor circuit to detect the instruction to start the lane change operation in response to the turn signal lever having been held in a predetermined position, which is different from a neutral position, for not less than a first threshold time,
in the second mode, the instructions further cause the at least one processor circuit to detect the instruction to start the lane change operation in response to the turn signal lever having been held in a predetermined position for not less than a second threshold time, and
the second threshold time is shorter than the first threshold time.

3. The apparatus according to claim 2, wherein after detecting the instruction to start the lane change operation, the instructions further cause the at least one processor circuit to start the lane change operation in response to the turn signal lever having moved from the predetermined position to the neutral position.

4. The apparatus according to claim 1, wherein the plurality of lane change modes include a third mode in which the instructions further cause the at least one processor circuit to plan the lane change operation and decide the start of the lane change operation, and
the first mode, the second mode, and the third mode can be selected while the driver is not gripping a steering wheel of the vehicle, and
the first mode and the second mode can be selected, but the third mode cannot be selected while the driver is gripping the steering wheel of the vehicle.

5. The apparatus according to claim 1, wherein the plurality of lane change modes include a third mode in which the instructions further cause the at least one processor circuit to plan the lane change operation and decide the start of the lane change operation, and
the first mode, the second mode, and the third mode can be selected in a case in which a degree of periphery monitory duty imposed on the driver is lower than a threshold level, and
the first mode and the second mode can be selected, but the third mode cannot be selected in a case in which the degree of periphery monitory duty imposed on the driver is higher than a threshold level.

6. The apparatus according to claim 1, wherein the instructions further cause the at least one processor circuit to:
detect, in the first mode, an instruction to cancel the lane change operation in response to an operation performed on a predetermined operation element by the driver, and
detect, in the second mode, the instruction to cancel the lane change operation in response to an operation performed on the predetermined operation element by the driver.

7. The apparatus according to claim 1, wherein until a predetermined time has elapsed or until a predetermined distance has been traveled since the completion of the lane change operation,
the instructions further cause the at least one processor circuit to:

suppress the execution of an additional lane change operation if the completed lane change operation was a lane change operation in accordance with the first mode, and allow the execution of the additional lane change operation if the completed lane change operation was a lane change operation in accordance with the second mode.

8. The apparatus according to claim 1, wherein the instructions further cause the at least one processor circuit to prioritize a lane change mode with a low degree of participation by the driver of the vehicle in a case in which the travel control is to be performed based on a travel plan set with a destination, compared with a case in which the travel control is to be performed based on a travel plan set without a destination.

9. An apparatus, comprising:
a vehicle having a control apparatus, the control apparatus comprising:
at least one processor circuit with a memory comprising instructions, that when executed by the processor circuit, cause the at least one processor circuit to at least:
recognize a travel environment of the vehicle;
generate a travel plan based on the travel environment; and
perform, based on the travel plan, travel control including at least one of acceleration/deceleration and/or steering of the vehicle, wherein in a case in which a lane change operation is to be performed, the instructions further cause the at least one processor circuit to at least:
select one lane change mode among a plurality of lane change modes that have different degrees of participation by a driver of the vehicle, and
perform the travel control in accordance with the selected lane change mode,
wherein the plurality of lane change modes include
a first mode in which the driver of the vehicle plans the lane change operation, and the driver of the vehicle issues an instruction to start the lane change operation, and
a second mode in which the instructions further cause the at least one processor circuit to plan the lane change operation, and the driver of the vehicle issues the instruction to start the lane change operation,
wherein an operation time of operation on an operation element of the vehicle performed by the driver to issue the instruction to the start of the lane change operation in the second mode is less than an operation time of operation on the operation element performed by the driver to issue the instruction to the start of the lane change operation in the first mode, and
wherein a position of the operation element for the driver to issue the instruction to the start of the lane change operation in the second mode is a same as a position of the operation element for the driver to issue the instruction to the start of the lane change operation in the first mode.

10. A control apparatus of a vehicle, the apparatus comprising:
at least one processor circuit with a memory comprising instructions, that when executed by the processor circuit, cause the at least one processor circuit to at least:
recognize a travel environment of the vehicle;
generate a travel plan based on the travel environment; and perform, based on the travel plan, travel control including at least one of acceleration/deceleration and/or steering of the vehicle,
wherein in a case in which a lane change operation is to be performed, the instructions further cause the at least one processor circuit to:
select one lane change mode among a plurality of lane change modes that have different degrees of participation by a driver of the vehicle, and
perform the travel control in accordance with the selected lane change mode,
wherein the plurality of lane change modes include
a third mode in which a driver of the vehicle plans the lane change operation, and
a fourth mode in which the instructions further cause the at least one processor circuit to plan the lane change operation, and
wherein an amount of operation on an operation element of the vehicle performed to issue an instruction to cancel the lane change operation started in accordance with the fourth mode is less than the amount of operation on the operation element performed to issue the instruction to cancel the lane change operation started in accordance with the third mode.

11. The apparatus according to claim 10, wherein
the operation element is a turn signal lever of the vehicle, the instructions further causing the at least one processor circuit to detect the instruction to cancel the lane change operation in response to an operation of the turn signal lever, and
the amount of operation performed to issue the instruction to cancel the lane change operation includes at least one of a time in which the turn signal lever is held at a predetermined position different from a neutral position and/or an amount of movement from the neutral position of the turn signal lever.

12. The apparatus according to claim 10, wherein
the operation element is an operation element for accelerating/decelerating and/or steering the vehicle, and
the amount of operation performed to issue the instruction to cancel the lane change operation includes at least one of an operation time of the operation element and/or an amount of movement of the operation element.

13. An apparatus, comprising:
a vehicle having a control apparatus, the control apparatus comprising:
at least one processor circuit with a memory comprising instructions, that when executed by the processor circuit, cause the at least one processor circuit to at least:
recognize a travel environment of the vehicle;
generate a travel plan based on the travel environment; and
perform, based on the travel plan, travel control including at least one of acceleration/deceleration and/or steering of the vehicle,
wherein in a case in which a lane change operation is to be performed, the instructions further cause the at least one processor circuit to:
select one lane change mode among a plurality of lane change modes that have different degrees of participation by a driver of the vehicle, and
perform the travel control in accordance with the selected lane change mode,
wherein the plurality of lane change modes include
a third mode in which a driver of the vehicle plans the lane change operation, and a fourth mode in which the instructions further cause the at least one processor circuit to plan the lane change operation, and wherein an amount of operation on an operation element of the vehicle performed to issue an instruction to cancel the lane change operation started in accordance with the fourth mode is less than the amount of operation on the operation element performed to issue the instruction to cancel the lane change operation started in accordance with the third mode.

14. A control method of a vehicle, the method comprising:
recognizing a travel environment of the vehicle;
generating a travel plan based on the travel environment; and
performing, based on the travel plan, travel control including at least one of acceleration/deceleration and/or steering of the vehicle,
wherein in a case in which a lane change operation is to be performed in the travel control,
one lane change mode is selected among a plurality of lane change modes that have different degrees of participation by a driver of the vehicle, and
the travel control is performed in accordance with the selected lane change mode,
wherein the plurality of lane change modes include
a first mode in which the driver of the vehicle plans the lane change operation, and the driver of the vehicle issues an instruction to start the lane change operation, and
a second mode in which a controller included in the vehicle plans the lane change operation, and the driver of the vehicle issues the instruction to start the lane change operation,
wherein an operation time of operation on an operation element of the vehicle performed by the driver to issue the instruction to the start of the lane change operation in the second mode is less than an operation time of operation on the operation element performed by the driver to issue the instruction to the start of the lane change operation in the first mode, and
wherein a position of the operation element for the driver to issue the instruction to the start of the lane change operation in the second mode is a same as a position of the operation element for the driver to issue the instruction to the start of the lane change operation in the first mode.

15. A control method of a vehicle, the method comprising:
recognizing a travel environment of the vehicle;
generating a travel plan based on the travel environment; and
performing, based on the travel plan, travel control including at least one of acceleration/deceleration and/or steering of the vehicle,
wherein in a case in which a lane change operation is to be performed in the travel control,
one lane change mode is selected among a plurality of lane change modes that have different degrees of participation by a driver of the vehicle, and
the travel control is performed in accordance with the selected lane change mode,
wherein the plurality of lane change modes include
a third mode in which a driver of the vehicle plans the lane change operation, and
a fourth mode in which a controller included in the vehicle plans the lane change operation, and
wherein an amount of operation on an operation element of the vehicle performed to issue an instruction to cancel the lane change operation started in accordance with the fourth mode is less than the amount of operation on the operation element performed to issue the instruction to cancel the lane change operation started in accordance with the third mode.

16. A non-transitory storage medium including a program configured to cause a computer to at least:
recognize a travel environment of the vehicle;
generate a travel plan based on the travel environment; and
perform, based on the travel plan, travel control including at least one of acceleration/deceleration and/or steering of the vehicle, wherein in a case in which a lane change operation is to be performed, the instructions further cause the at least one processor circuit to at least:
select one lane change mode among a plurality of lane change modes that have different degrees of participation by a driver of the vehicle, and
perform the travel control in accordance with the selected lane change mode,
wherein the plurality of lane change modes include
a first mode in which the driver of the vehicle plans the lane change operation, and the driver of the vehicle issues an instruction to start the lane change operation, and
a second mode in which the instructions further cause the at least one processor circuit to plan the lane change operation, and the driver of the vehicle issues the instruction to start the lane change operation,
wherein an operation time of operation on an operation element of the vehicle performed by the driver to issue the instruction to the start of the lane change operation in the second mode is less than an operation time of operation on the operation element performed by the driver to issue the instruction to the start of the lane change operation in the first mode, and
wherein a position of the operation element for the driver to issue the instruction to the start of the lane change operation in the second mode is a same as a position of the operation element for the driver to issue the instruction to the start of the lane change operation in the first mode.

17. A non-transitory storage medium including a program configured to cause a computer to at least:
recognize a travel environment of the vehicle;
generate a travel plan based on the travel environment; and
perform, based on the travel plan, travel control including at least one of acceleration/deceleration and/or steering of the vehicle,
wherein in a case in which a lane change operation is to be performed, the instructions further cause the at least one processor circuit to:
select one lane change mode among a plurality of lane change modes that have different degrees of participation by a driver of the vehicle, and
perform the travel control in accordance with the selected lane change mode,
wherein the plurality of lane change modes include
a third mode in which a driver of the vehicle plans the lane change operation, and
a fourth mode in which a controller plans the lane change operation, and
wherein an amount of operation on an operation element of the vehicle performed to issue an instruction to cancel the lane change operation started in accordance with the fourth mode is less than the amount of operation on the operation element performed to issue the instruction to cancel the lane change operation started in accordance with the third mode.

* * * * *